Patented Apr. 19, 1949

2,467,693

UNITED STATES PATENT OFFICE 2,467,693

AMINO BENZNAPHTHYRIDINES AND PROCESSES FOR PREPARING THE SAME

Vladimir Alexander Petrow, Carshalton, England, assignor to Therapeutic Research Corporation of Great Britain Limited, London, England, a British company No Drawing. Original application September 17, 1945, Serial No. 616,969. Divided and this application July 14, 1947, Serial No. 760,934. In Great Britain September 21, 1944

9 Claims. (Cl. 260—288)

This invention is for improvements in or relating to the production of new therapeutically valuable benznaphthyridines and is divided from my co-pending application No. 616,969, filed September 17, 1945.

According to the present invention, new therapeutically valuable benznaphthyridines are obtained by treating with ammonia a 2-halogeno-3:4-benzo-1:7-naphthyridine which latter compounds are obtainable from the corresponding 1:7-naphthyridones, themselves prepared by the processes claimed in the specification of co-pending application No. 616,969.

These new naphthyridines conform to the general formula:

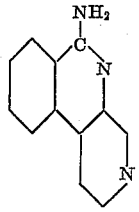

in which one or more of the fused rings may carry additional 5- or 6-membered rings and/or additional substituents such, for example, as alkyl (e. g. methyl, ethyl or propyl), aryl (e. g. phenyl), aralkyl (e. g. benzyl, phenylethyl or phenylpropyl), acyl groups (e. g. acetyl, propionyl and benzoyl) and carbalkoxy groups (e. g. carbethoxy) and halogen atoms (e. g. chlorine or bromine atoms). Of these compounds the most important, from a chemotherapeutic standpoint, are those containing methyl groups in the 6- and 8-positions. Specific examples are 2-amino-6:8-dimethyl-3:4-benzo-1:7-naphthyridine and 2-amino - 5 - carbethoxy - 6:8-dimethyl-3:4-benzo-1:7-naphthyridine.

In carrying the present invention into effect, it is preferred to heat the 2-halogeno-3:4-benzo-1:7-naphthyridine, preferably the 2-chloro compounds, with saturated alcoholic ammonia or concentrated ammonia (0.88 s. g.), desirably in the presence of a soluble copper salt such as copper acetate, in a closed vessel at elevated temperature until the reaction is completed. Surprising though it may seem, it is found that under these conditions a carbalkoxy group (e. g. a carbethoxy group), for example at position 5 in the benznaphthyridine, does not simultaneously react with ammonia to produce the acid amide as might have been expected. The reaction product is isolated and purified following customary methods of procedure, one of which is illustrated in the following examples.

The halogeno starting materials are obtainable from the naphthyridones of co-pending application No. 616,969 by methods known for the conversion of hydroxypyridine, -quinoline, and -phenanthrine derivatives into the corresponding halogen compounds. Alternatively, the halogen derivatives may be readily prepared by heating the benznaphthyridone with a phosphorus oxyhalide or with a phosphorus pentahalide in phosphorus oxyhalide suspension at elevated temperature, preferably between 170° and 190° C. The reaction is effected in a sealed vessel or alternatively the reactants are heated at normal pressure, i. e. in an open vessel in an inert high-boiling solvent medium which may be, for example, nitrobenzene or a dialkyl-aniline such as diethyl-aniline.

The following examples serve to illustrate the invention but are not to be considered as limiting it in any way:

Example I 2.7 g. of 2-chloro-6:8-dimethyl-3:4-benzo-1:7-naphthyridine, saturated alcoholic ammonia (15 ml.) and a trace of copper acetate were heated in a sealed tube at 180–190° C. for 16 hours. The product was taken to dryness, extracted with water (charcoal), and made alkaline with a 5% w./v. aqueous solution of sodium hydroxide. The precipitated base (2-amino-6:8-dimethyl-3:4-benzo-1:7-naphthyridine), purified via the picrate (silky yellow needles from ethyl alcohol (95% v./v.), M. P. 261–262° C. (with decomposition)), formed cubes from light petroleum, M. P. 189.5–190.5° C. The dihydrochloride formed octahedra from aqueous alcoholic hydrogen chloride, M. P. 310° C.

The 2 - chloro - 6:8 - dimethyl-3:4-benzo-1:7-naphthyridine was prepared in the following manner: Finely powdered 6:8-dimethyl-3:4-benzo-1:7-naphthyrid-2-one prepared by the process of Example I of co-pending application No. 616,969 and phosphorus oxychloride (18 ml.) were heated in a sealed tube at 180° C. for 6 hours. The phosphorus halides were removed in vacuo on the water bath. The residual oil was decomposed with ice, made alkaline with excess ammonia, and extracted with chloroform. The chloroform extracts were filtered, washed with water, dried and the chloroform removed. The crude chlorocompound was obtained pure in glancing white needles by crystallisation (Norit) from light petroleum (B. P. 100–120° C.), (M. P. 153–154° C.).

*Example II*

2 - chloro-5-carbethoxy-6:8-dimethyl-3:4-benzo-1:7-naphthyridine (2 grams) was heated with saturated ethyl alcoholic solution of ammonia (20 ccs.) and a trace of copper acetate in a sealed tube at 180° C. for 8 hours. The product was evaporated to dryness, decomposed by making alkaline with sodium hydroxide solution (5% w./v.) and the liberated base after crystallisation once from aqueous acetone and then from a mixture of ethyl alcohol and benzene was obtained as flat pale yellow needles melting at 200 to 201° C. Its identity as 2-amino-5-carbethoxy-6:8-dimethyl-3:4-benzo-1:7 - naphthyridine was confirmed by its reconversion to the hydroxy compound (enolised form of 5-carbethoxy-6:8-dimethyl-3:4-benzo-1:7 - naphthyrid - 2 - one) on treatment with nitrous acid, the naphthyridone so prepared being identical in melting point and mixed melting with 5-carbethoxy-6:8-dimethyl-3:4-benzo-1:7-naphthyridone prepared as described in our co-pending application No. 616,969.

The 2-chloro-5-carbethoxy-6:8-dimethyl-3:4-benzo-1:7-naphthyridine was obtained in the following manner: 5-carbethoxy-6:8-dimethyl-3:4-benzo-1:7-naphthyrid-2-one (3 grams) prepared as described in Example VII of co-pending application No. 616,969 was heated under reflux at 150–160° C. with phosphorus pentachloride (2.2 grams) and phosphorus oxychloride (15 ml.) until all the solid had reacted and passed into solution. Excess of phosphorus halides was removed under reduced pressure while heating on the water bath, the residue was then ground with dilute ammonia solution (10% by weight of NH3) and after standing for 12 hours at room temperature, the solid was collected. After washing from a little hot alcohol, the product was crystallised from a mixture of benzene and light petroleum and 5-carbethoxy-6:8-dimethyl - 3:4 - benzo - 2-chloro-1:7-naphthyridine was thus obtained as faintly pink octahedra melting at 186–187° C.

I claim:

1. A process for the manufacture of aminonaphthyridines which comprises heating a 2-halogeno-3:4-benzo-1:7 naphthyridine with a saturated solution of ammonia in a sealed vessel in the presence of a copper salt.

2. A process for the manufacture of aminonaphthyridines which comprises heating a 2-halogeno-3:4-benzo - 1:7 - naphthyridine with a saturated solution of ammonia in a sealed vessel in the presence of copper acetate.

3. A process for the manufacture of 2-amino-6:8 - dimethyl - 3:4 - benzo - 1:7 - naphthyridine which comprises heating 2 - halogeno - 6:8 - dimethyl-3:4-benzo-1:7-naphthyridine with a saturated solution of ammonia in a sealed vessel in the presence of a copper salt.

4. A process for the manufacture of 2-amino-6:8 - dimethyl - 3:4 - benzo - 1:7 - naphthyridine which comprises heating 2 - halogeno - 6:8 - dimethyl-3:4-benzo-1:7-naphthyridine with a saturated solution of ammonia in a sealed vessel in the presence of copper acetate.

5. A process for the manufacture of 2-amino-6:8 - dimethyl - 3:4 - benzo - 1:7 - naphthyridine which comprises heating 2-chloro-6:8-dimethyl-3:4-benzo-1:7-naphthyridine with a saturated solution of ammonia in a sealed vessel in the presence of a copper salt.

6. A process for the manufacture of 2-amino-5 - carbethoxy - 6:8 - dimethyl - 3:4-benzo - 1:7-naphthyridine which comprises treating 2-halogeno-5 - carbethoxy-6:8 - dimethyl - 3:4 - benzo-1:7-naphthyridine with a saturated solution of ammonia in a sealed vessel in the presence of a copper salt.

7. Amino benznaphthyridines of the formula:

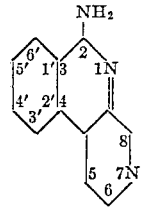

8. The compound 2-amino-6:8-dimethyl-3:4-benzo-1:7-naphthyridine.

9. The compound 2-amino-5-carbethoxy-6:8-dimethyl-3:4-benzo-1:7-naphthyridine.

VLADIMIR ALEXANDER PETROW.

REFERENCES CITED

The following references are of record in the file of this patent:

FOREIGN PATENTS

| Number | Country | Date |
| --- | --- | --- |
| 282,143 | Great Britain | Dec. 12, 1927 |
| 454,525 | Great Britain | Oct. 2, 1936 |